US011815653B2

(12) United States Patent
Ulmer et al.

(10) Patent No.: US 11,815,653 B2
(45) Date of Patent: Nov. 14, 2023

(54) MODULAR WEATHER SENSING SYSTEM AND METHOD

(71) Applicant: INTELLISENSE SYSTEMS, INC., Torrance, CA (US)

(72) Inventors: Christopher Ulmer, San Pedro, CA (US); David Miller, San Pedro, CA (US); Anthony Michael, Los Angeles, CA (US); Thomas Vu, Rancho Palos Verdes, CA (US); Jeffrey Norell, Los Angeles, CA (US); David Gustavson, Los Angeles, CA (US); Gregory Peng, Long Beach, CA (US); Drew Yenzer, Culver City, CA (US); Haider Rasool, Redondo Beach, CA (US)

(73) Assignee: INTELLISENSE SYSTEMS, INC., Torrance, CA (US)

( * ) Notice: Subject to any disclaimer, the term of this patent is extended or adjusted under 35 U.S.C. 154(b) by 0 days.

(21) Appl. No.: 18/099,716

(22) Filed: Jan. 20, 2023

(65) Prior Publication Data
US 2023/0152486 A1     May 18, 2023

Related U.S. Application Data

(62) Division of application No. 16/598,949, filed on Oct. 10, 2019, now Pat. No. 11,561,325.

(51) Int. Cl.
*G01W 1/04*     (2006.01)
*G01W 1/14*     (2006.01)

(52) U.S. Cl.
CPC ............... *G01W 1/04* (2013.01); *G01W 1/14* (2013.01)

(58) Field of Classification Search
CPC ........... G01W 1/00; G01W 1/10; G01W 1/02; G01W 1/14; G01W 1/08; G01W 1/04;
(Continued)

(56) References Cited

U.S. PATENT DOCUMENTS 3,963,347 A * 6/1976 Segre ....................... G01W 1/00
372/15
5,070,732 A    12/1991 Duncan et al.
(Continued)

FOREIGN PATENT DOCUMENTS

CN    207020324         2/2018
CN    112578477 A       3/2021
(Continued)

OTHER PUBLICATIONS

All Weather Inc., "Model 8340 Cloud Height Indicator Laser Ceilometer User's Manual," Jan. 1, 2011, retrieved from Internet: http://www.allweatherinc.com/wp-content/uploads/8340-F-011.pdf, 66 pages.
(Continued)

*Primary Examiner* — Andre J Allen
(74) *Attorney, Agent, or Firm* — Sheppard, Mullin, Richter & Hampton LLP

(57) ABSTRACT

An assembly and method for using weather sensors with enhanced modular capability is disclosed. The weather sensor assembly generally comprises a cap module, middle module, and a base module, where the cap module, middle module(s) and the base module are stacked adjacently to provide environmental sealing, weather sensing, and electrical connectivity to the weather sensor assembly. One or more ring mechanisms may be included that interlock the cap module, middle module(s), base module to form the weather sensor assembly into an integrated unit. Moreover, the ring mechanisms enable further modules to be added to the weather sensor assembly for additional capabilities. By doing so, each of the modules in the weather sensor assembly may be independent units that can be removed, reordered, swapped, and added for desired sensing modalities and environments.

8 Claims, 14 Drawing Sheets

(58) Field of Classification Search
CPC ... G01W 1/06; G01W 2001/003; G01W 1/17; G01W 1/16; G01W 2001/006; G01W 2203/00
USPC ...................................................... 73/170.16
See application file for complete search history.

(56) References Cited

U.S. PATENT DOCUMENTS

| | | | |
|---|---|---|---|
| 5,536,177 | A | 7/1996 | Casey |
| 6,402,031 | B1 | 6/2002 | Hall |
| 6,650,402 | B2 * | 11/2003 | Sullivan .................. G01S 17/95 356/5.01 |
| 6,766,950 | B2 | 7/2004 | Hall |
| 7,172,119 | B2 | 2/2007 | Hall |
| 7,335,067 | B2 | 2/2008 | Lee et al. |
| 7,931,198 | B2 | 4/2011 | Hall |
| 11,119,249 | B2 * | 9/2021 | Ulmer .................... G01W 1/08 |
| 11,561,325 | B2 * | 1/2023 | Ulmer .................... G01W 1/11 |
| 11,566,938 | B2 * | 1/2023 | Brown .................. G01J 1/0219 |
| 11,674,843 | B2 * | 6/2023 | Zedlitz .................. G01J 1/0271 73/170.27 |
| 2002/0153419 | A1 | 10/2002 | Hall |
| 2010/0284154 | A1 | 11/2010 | Caron et al. |
| 2018/0203158 | A1 | 7/2018 | Ulmer et al. |

FOREIGN PATENT DOCUMENTS

| | | |
|---|---|---|
| EP | 1890170 | 2/2008 |
| ES | 2 217 960 | 11/2004 |
| WO | WO 2018/049189 | 3/2018 |
| WO | WO 2019/090391 | 5/2019 |

OTHER PUBLICATIONS

International Search Report and Written Opinion dated Mar. 1, 2021 for International Application No. PCT/US2020/046520, filed Aug. 14, 2020.

* cited by examiner

MODULAR WEATHER SENSING SYSTEM AND METHOD

CROSS-REFERENCE TO RELATED APPLICATION

The present application is a divisional of and claims priority to U.S. patent application Ser. No. 16/598,949, filed Oct. 10, 2019 and titled "MODULAR WEATHER SENSING SYSTEM AND METHOD," which is incorporated herein by reference in its entirety.

STATEMENT OF RIGHTS TO INVENTIONS MADE UNDER FEDERALLY SPONSORED RESEARCH

This invention was at least partially made with Government support under contracts N68335-19-C-0206 and FA8652-19-P-W103 awarded by the Naval Air Warfare Center and Air Force, respectfully. The Government may have certain rights in the invention(s) described herein.

TECHNICAL FIELD

The disclosed technology relates generally to the area of modular weather sensor systems. More specifically, some embodiments of the disclosed technology relate to a fully modularized weather sensor system that forms stacks of interchangeable modules when interconnected.

DESCRIPTION OF RELATED ART

Weather sensor systems have been used for measurement and prediction of the weather since at least the middle of the 17th century with the creation of the mechanical barometer. Since then, development and use of modern weather sensors, which are generally electronic in nature, have proliferated into a significant industry with multi-billion dollar annual revenues, worldwide adoption, and diverse applications. While numerous companies have been successful at commercializing these sensors, none have successfully achieved an all-in-one sensor that can measure a whole suite of weather parameters in a single, compact package and which is also reconfigurable to meet specific sensing demands.

Among commercial and non-commercial offerings within the current art, weather sensors are offered as either fixed combinations of sensors, or as modular sensor elements that must be connected by cables and arranged on a tripod, structure, or stand. For example, if an application requires measurement of temperature, pressure, and humidity there are several offerings that measure these three parameters in a single unit; however, if cloud height and atmospheric visibility are also desired, two other units must be mounted separately from the temperature, pressure, and humidity sensor, and then cabled into a common data collector. This latter approach of mounting disparate elements onto a tripod, scaffold, or frame and cabling them together is analogous to hanging ornaments on a tree in a somewhat bulky and clumsy fashion as representative of the current state of the art.

Except for applications that measure certain specific sets of weather parameters that are measured together and are available as single units, creation of weather sensors systems using the current art treat each single sensor or combined sensors as a discrete unit that must be mounted separately and cabled separately. While co-locating separate elements on a tower, scaffold, or other manner of frame, and connected them through cables to a central data collector is flexible, the resulting systems are bulky and require significant assembly to erect. And while some manufacturers have begun to combine a few sensors together into multi-sensor units with preselected combinations of sensors, these systems lack flexibility to permit changes to the combination of sensors and are limited to sensors that lend themselves to tight co-location. What is still lacking in the centuries of development of weather sensing technologies is any system that combines both true modularity and tight integration in the same technology. No system is currently available with sufficient modularity to enable a reconfigurable, all-in-one weather system formed from fully-packaged modules that is suitable for measuring any combination of weather inputs while also supporting both tight integration into a single effective unit as well as physical separation when specifically demanded by the application.

BRIEF SUMMARY OF EMBODIMENTS

Embodiments of the disclosed technology may utilize a framework of rotate-to-lock modular sensor elements that can be combined on the same stack to form a single unit or can be separated by cable if physical separation is desired. This approach may be implemented in various embodiments to achieve the best of three worlds, supporting (1) complete fully-packaged modules, (2) compact integration of modules into a single unit when desired, and (3) physical separation of modules when desired.

In less strenuous applications (e.g., civilian applications), the presently disclosed technology, in some embodiments, may also be cost-effective by enabling tailoring of various weather sensor configurations to precisely meet civilian customer needs without requiring purchase of unneeded capabilities and without complex mounting frames. In more strenuous applications (e.g., military or advanced commercial applications), the presently disclosed technology, in some embodiments, may be extremely compact and easy to deploy by enabling a single unit to be preconfigured in advance of a mission, and enabled on site with single-switch activation and essentially no in-field assembly. In scientific applications, the presently disclosed technology, in some embodiments, can be extremely flexible, by providing a framework for new, application specific sensors to be created and fielded as needed. Specifically, an interlocking framework described herein can not only be used to implement the sensors described herein but also new scientific sensor capabilities not yet conceived. All of these specific benefits can be further generalized across all fields that can benefit from modularity, compactness, ease of setup, and versatility.

Various embodiments of the presently disclosed technology include an apparatus comprising: a weather sensor assembly comprising a cap module, a middle module of a plurality of middle modules, and a base module, wherein the cap module, the middle module of the plurality of middle modules, and the base module are stacked adjacent one another to detachably seal and provide power to the weather sensor assembly; one or more ring mechanisms located between the cap module and the base module, wherein the one or more ring mechanisms releasably couple the cap module, the middle module of the plurality of middle modules, and the base module to form the weather sensor assembly into an integrated unit; and each module of the plurality of middle modules comprises an independent unit configured to be removed, swapped, reordered, or added to the weather sensor assembly corresponding to a desired configuration; and the cap module and each module of the plurality of middle modules comprise a sensor configured to detect weather parameters.

Another example embodiment describes a weather sensor assembly comprising: a base module comprising a processor and comprising a top ring element configured to couple one or more sensor modules; and one or more sensor modules comprising a bottom ring element configured to releasably couple to the top ring element of the base module, each sensor module configured to receive power from the base module and to provide data to the base module.

Further embodiments are directed to a weather sensor comprising: a ceilometer module comprising two optical windows embedded in a recessed and sloped surface; a first optical window of the two optical windows configured to transmit a laser; a second optical window of the two optical windows configured to receive a reflection of the laser; a vertical wall circumscribes the recessed and sloped surface and the two optical windows; wherein the recessed and sloped surface within the vertical wall collects precipitation; and the ceilometer module measures cloud height and precipitation volume concurrently based on the collected precipitation and the collected laser refection.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the present disclosure to the precise form disclosed. It should be understood that the disclosed technology can be practiced with modification and alteration, and that the disclosed technology be limited only by the claims and the equivalents, thereof.

DETAILED DESCRIPTION OF THE EMBODIMENTS

Embodiments of the disclosed technology may be configured to achieve a modular system with rotate-to-lock interconnections that can be both mechanically strong and able to carry a common power/data bus without cables and connectors. The presently disclosed technology may also support extension of the power/data bus via external cable where external separation of sensor module elements is desired. Additionally, embodiments may be configured to provide a weather sensor package that is modular at both the mechanical and electrical level and can further be configured to achieve self-contained, fully packaged and protected modules. The detailed description that follows begins with a sample configuration of a fully assembled and configured sensor stack that can consist of multiple sensor elements, followed by an illustration of the separation of each individual module. The description continues with a high-level view of the system architecture viewed as three module types (base-modules, mid-modules, and cap-modules) that may be designed to be combined in prescribed ways to achieve a multitude of permutations. This architecture then is fully illustrated in sample configurations followed by a detailed discussion of the mechanical architecture and components of selected example modules.

The disclosed system in various embodiments can be designed specifically to be highly modular to address multiple use cases in a wide range of possible applications and environments but without disparate elements being mounted in physically separated locations unless otherwise desired by the application. Because of its modularity, there is no single form for the disclosed technology but rather a range of similar but distinct configurations that may be created by various combinations of modules. The common form factor for all modules can be approximately 5-inch diameter cylindrical form factor with variations on that substantially cylindrical shape as needed for extended arms for some particular modules that. While a larger or smaller diameter might be feasible, the 5-inch diameter was found to be better in terms of compactness and adequate room for key sensor elements including high accuracy barometric sensors, and the lidar core for the ceilometer. Earlier designs were fully realized in 6-inch and 4.75-inch diameter form factors before settling on the 5-inch optimum diameter.

Figure 1:
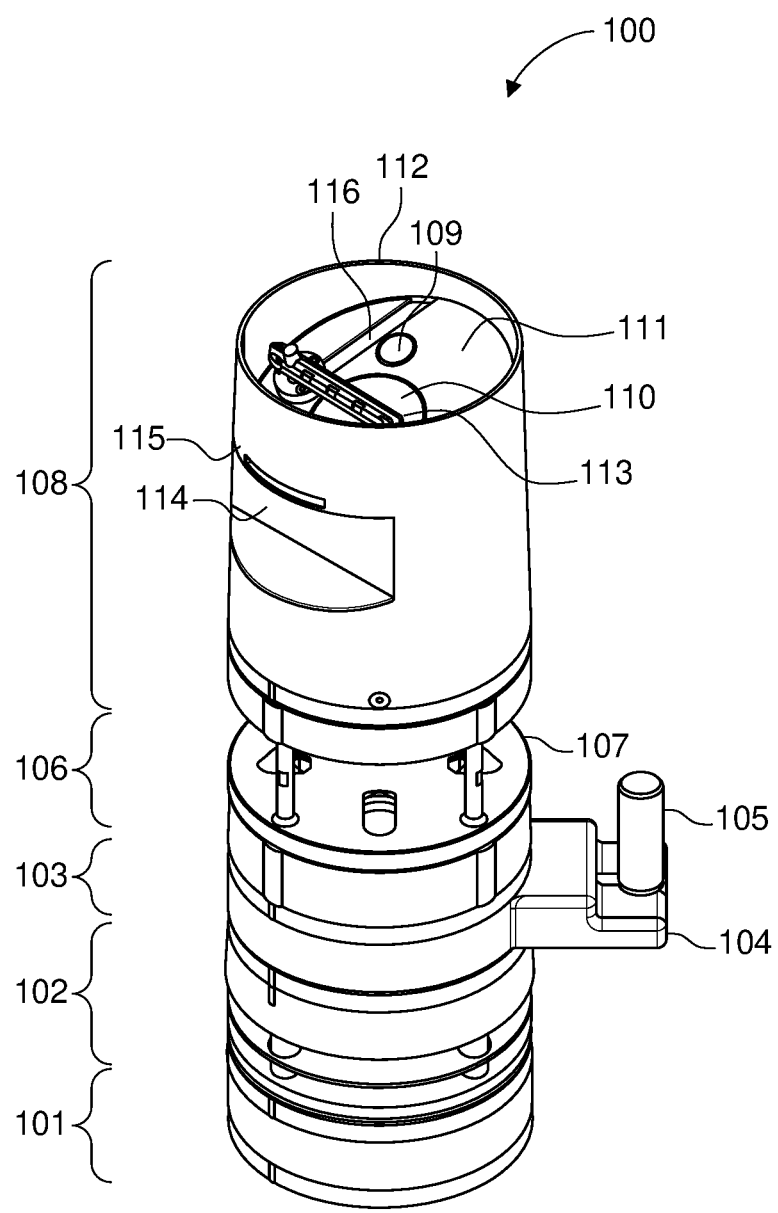
FIG. 1 illustrates a sample configuration of a weather sensing system as deployed with modules present for main processing, temperature, pressure, and humidity measurement, satellite communication, wind measurement, cloud height measurement, and precipitation measurement, in accordance with various embodiments.

FIG. 1 illustrates a sample configuration of a weather sensing system as deployed with modules present for main processing, temperature, pressure, and humidity measurement, satellite communication, wind measurement, cloud height measurement, and precipitation measurement, in accordance with various embodiments. Referring to FIG. 1, various embodiments of the system, 100, may include a base module, 101, which can be the central processing unit for the stack of modules. Connected to the top of the base-module may be a temperature, barometric pressure, and humidity module, 102. Above the temperature, pressure, and humidity module can be a satellite connectivity module, 103, with an integral antenna arm, 104, that can include a satellite connectivity antenna, 105. Above the satellite connectivity module may be a wind speed and direction sensing module, 106, that can measure the speed and direction of wind through its wind sensing gap, 107. On the top of the system 100 may be a ceilometer module, 108, that can measure cloud height while also measuring the amount of precipitation that is cleared from its upper surface.

The novel ability to both measure cloud height and precipitation from within the same 5-inch diameter top surface may be achieved by placing an optical window for the transmit laser, 109, and an optical window for receiving the laser reflection, 110, within a recessed, sloped surface, 111, surrounded by vertical walls, 112, that encircle the diameter of the module. Rainfall that lands within that diameter may be captured for accurate measurement. A wiper mechanism, 113, can clear the windows of water and debris by pushing them to the low point of the surface within the diameter walls. Water can be filtered through a fine screen and may be measured by passing through a droplet former and droplet counter before being expelled from an opening in the side of the unit, 114. An example of a suitable droplet former and droplet counter is described in co-pending U.S. application Ser. No. 15/694,750, hereby incorporated by reference. Debris unable to pass through the filter can be expelled through a gap, 115, in the side of the housing above the level of the screen. To maintain the shape of the wiper and to minimize accumulation of debris on the wiper itself, the wiper can rest above a groove in the recessed surface, 116, between wiping cycles.

This system described above is not comprehensive of all potential system components but illustrates a practical example configuration that is suitable for many weather sensing applications. This system as shown would be able to measure temperature, barometric pressure, humidity, wind speed, wind direction, cloud height, and precipitation amount and would be able to transmit those readings via satellite under control of the main processor. For other applications, additional modules could be added by the system operator in order to impart additional capabilities to the system. Specifically, each of the modules in the system may be independent units that can be removed, reordered, swapped, and added in the field.

Figure 2:
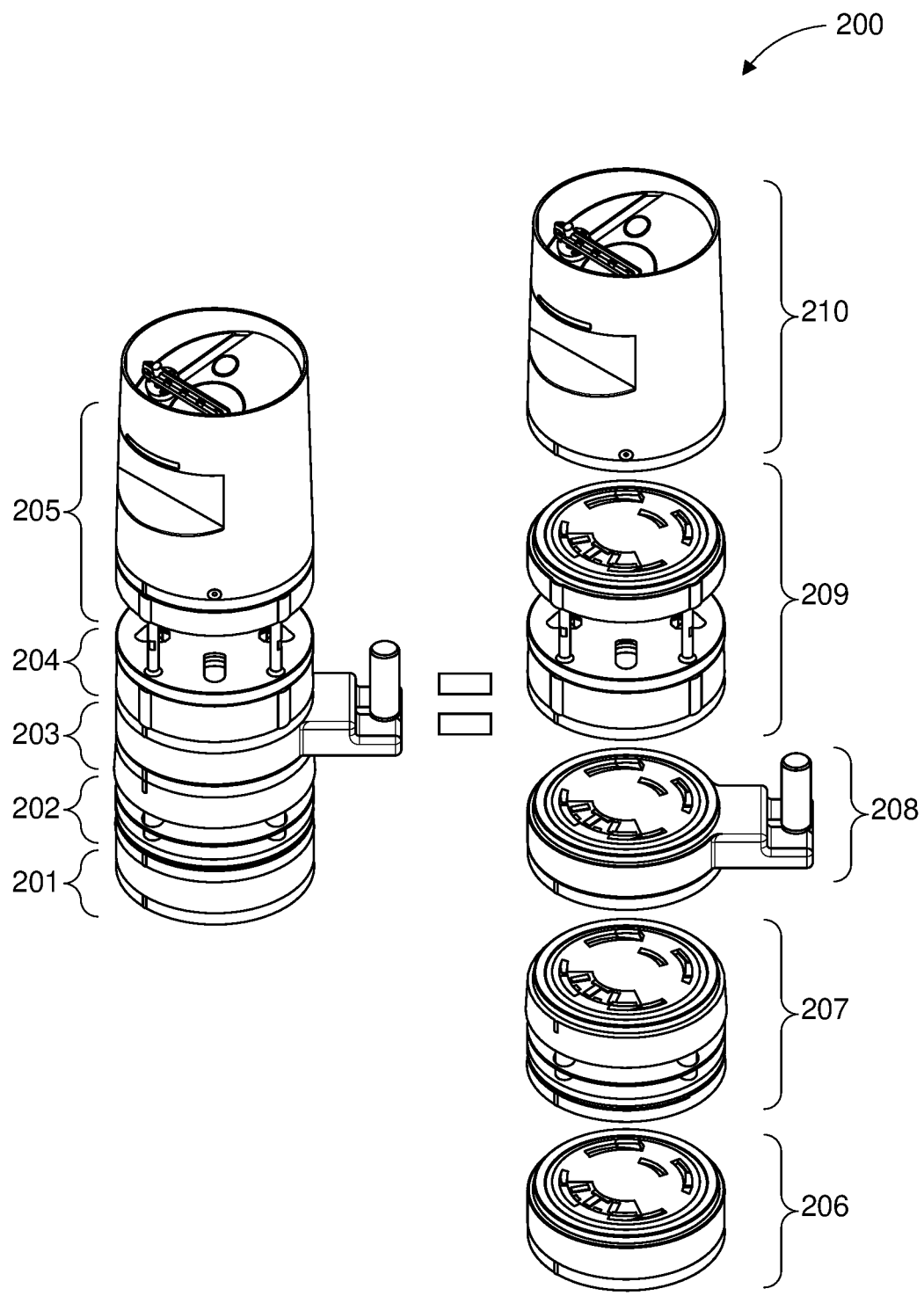
FIG. 2 illustrates a view of a sample configuration of modules from a coupled perspective and from an uncoupled perspective, in accordance with various embodiments.

FIG. 2 illustrates an example of the modular nature of a weather sensing system by showing a view of a sample configuration of modules from a coupled perspective and from an uncoupled perspective, in accordance with various embodiments. Referring to FIG. 2, a view, 200, shows a first perspective of an assembled stack of modules locked together in a common stack on the left and the same modules as separate items shown separately in an exploded perspective on the right, demonstrating the mechanical independence of each module. The base module and central processor, 201, temperature, pressure, and humidity module, 202, satellite connectivity module, 203, wind module, 204, and ceilometer and precipitation amount module, 205, when physically connected can function as a single unit. However, each can be acquired separately and then combined in the field as desired, without the need for tools. Specifically, the base module and central processor, 206, temperature, pressure, and humidity module, 207, satellite connectivity module, 208, wind module, 209, and ceilometer and precipitation amount module, 210, may be fully-packaged units. And by each unit being fully packaged, there are no tools necessary for assembling the modules together. Possibly only a simple pressing and rotating of the modules together may be required for the twist-to-lock seal and electrical connection to form. This ease of removing, swapping, or adding fully-packaged modules is also ideal for periodic recalibration or maintenance of critical sensor modules.

An enabling technology of this modular capability that underpins the modular connection between elements may include novel ring elements that can be designed in various embodiments to specifically to interlock with each other. This technology allows the top of one module, to connect to the bottom of another module while carrying all electrical, mechanical, and environmental connections. Specifically, the electrical signals carried between the interlocking rings can include both power and data signals and are carried on a shared power/data bus that may be carried vertically along the stack of modules and conceivably extended through a connector on the bottom of the base module with internal processor. The rotate-to-lock mechanical connection may be made by pressing the modules together axially and the rotating clockwise. The mechanical locking may occur primarily near the perimeter of the locking rings in order to transfer mechanical stiffness and strength across the link. The environmental connection may utilize a seal that is air-tight or dust-tight depending on selected gasket to carry the environmental seal between modules.

Figure 3:
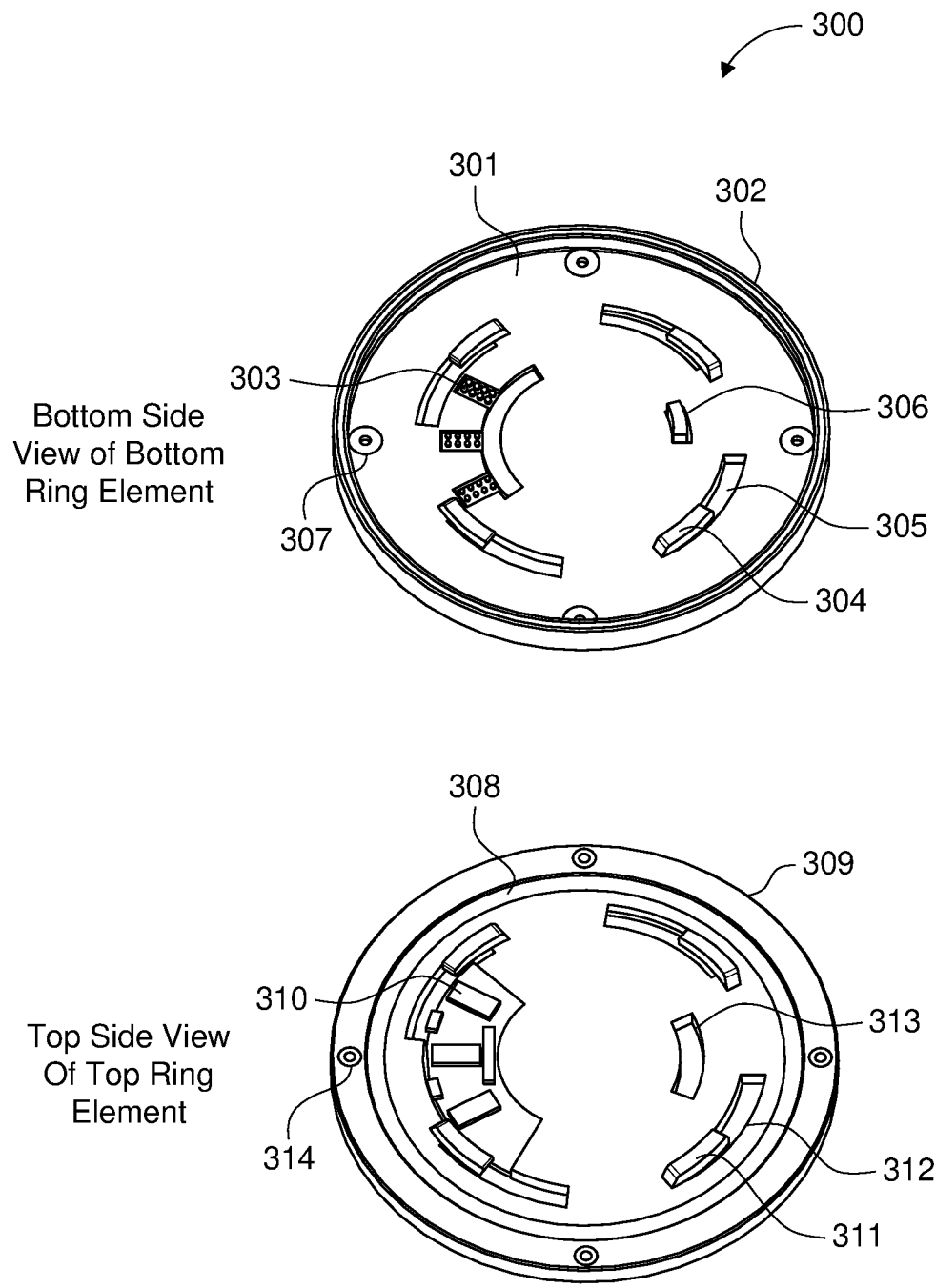
FIG. 3 illustrates an example interlocking ring system that enables the modularity of the overall system, connection of the shared power/data bus by quadruple-redundant spring pins, and mechanical interconnection using a twist-to-lock motion, in accordance with various embodiments.

FIG. 3 illustrates an example interlocking ring system that enables the modularity of the overall system, connection of the shared power/data bus by quadruple-redundant spring pins, and mechanical interconnection using a twist-to-lock motion, in accordance with various embodiments. Referring to FIG. 3, a detailed view of the interlocking ring mechanism, 300, shows both the bottom side view of the bottom ring element and the top side view of the top ring element. These two ring mechanisms form the basis for the modular system and may be repeated in all members of the family of modules such that the top ring element can be designed to connect with the bottom ring element, carrying electrical power and data, mechanical strength, and an environmental seal. All three may be achieved in the simple twist-to-lock action. Though able to work in isolation, these elements can be intended to be incorporated as sub-assemblies into modules. Specifically, in some embodiments the top ring element can be designed to be the top-most component in a module, and the bottom ring element can be designed to be the bottom-most component in a module.

Features of the bottom ring element may include a smooth bottom surface, 301, suitable for forming an air-tight seal with and O-ring to protect electrical connections from the environment. A lip around the perimeter, 302, of the bottom side ring element can be designed in some embodiments to lap over a top side ring element that might be connected below it to further protect the seal from rain and other environmental effects. Three sets of eight-pin spring contacts, 303, carry five signals that comprise the power/data bus that can be shared by all modules in a stack of modules. The five signals may be ground, power, heater power, data transmit, and data receive. The ground signal can be 8-fold redundant with eight spring contacts dedicated to that signal. All the other four signals may have quadruple redundancy with four spring contacts dedicated to each signal. Redundancy is utilized for increased reliability of the connections. A set of four hooks, 304, and four slots, 305, may achieve the mechanical interlock when the pieces are pressed together and rotated. A raised bump on each of the four arms can meet a corresponding detent in the arms of the other piece to click the pieces together. A raised bar, 306, acts as a keying feature that can allow the bottom and top ring sections to only fit together in one way. A pattern of four screws, 307, may be utilized for permanent attachment of the piece to whatever piece is above it to form a module.

Features of the top ring element may include a smooth channel, 308, for holding an O-ring and forming an air-tight seal to protect electrical connections from the environment. The perimeter, 309, is slightly recessed to fit under the lip of a bottom ring element that may lap over it. Three sets of electrical contact pads, 310, receive the pin spring contacts from a bottom ring element that may mate with it. The contact pads carry the same five signals as previously described to comprise the power/data bus that can be shared by all modules in a stack of modules, and with the same level of redundancy. A set of four hooks, 311, and four slots, 312, mirror the slots and hooks of the mating bottom element to potentially achieve a mechanical interlock when the pieces are pressed together and rotated. An additional slot, 313, may act as a keying feature by receiving the raised bar from the bottom module. A pattern of four screws, 314, may be utilized for permanent attachment of the piece to whatever piece is below it to form a module.

Figure 4:
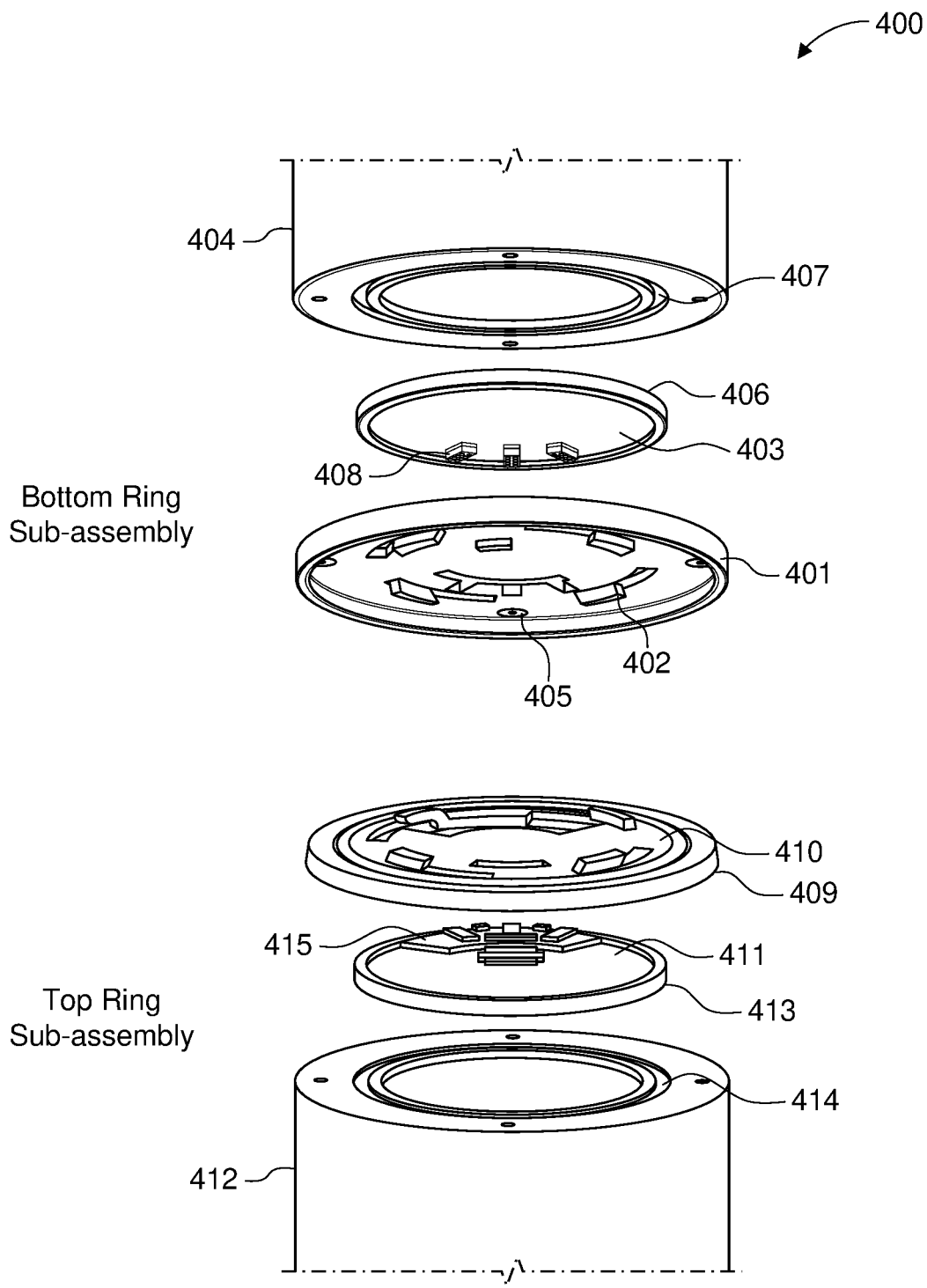
FIG. 4 illustrates an internal structure and components of an example interlocking ring system as two exploded views, in accordance with various embodiments.

FIG. 4 illustrates an internal structure and components of an example interlocking ring system as two exploded views, in accordance with various embodiments. Referring to FIG. 4, an exploded view of the bottom and top ring sub-assemblies, 400, reveals further detail. The bottom ring assembly, which can be placed at the bottom of a module for the purpose of connecting to the top of any module below it, consists first the bottom ring, 401. The bottom ring is the solid section that may include four hooks and recesses, 402, that achieves mechanical interconnection with whatever module is connected below it. Above the bottom ring can be the circular printed circuit board, 403, that may be sandwiched between the bottom ring below, and a cylindrical section above, 404, using screws around the perimeter, 405. Around the perimeter of the circular printed circuit board can be a custom elastomeric C-cross-sectional gasket, 406. When the printed circuit board and gasket is sandwiched between the hard components above and below it, the elastomeric gasket can be compressed into a circular gap, 407, in the hard components above and below to form an air tight barrier at the printed circuit board. A key feature of the printed circuit board that maintains the air tight seal may be that there are no holes in the board which are not fully filled and closed. Mounted to the circular board may be the three sets of eight spring-loaded pins, 408, that form the quadruple-redundant electrical interconnect between modules including both power and data.

The exploded view of the top ring sub-assembly may consist first of the top ring, 409. The top ring can be the solid section that includes four hooks and recesses, 410, that achieves mechanical interconnection with designated module connected above it. Below the top ring can be the circular printed circuit board, 411, that may be sandwiched between the top ring above, and a cylindrical section below, 412. Around the perimeter of the circular printed circuit board can be a custom elastomeric C-cross-sectional gasket, 413. When the printed circuit board and gasket is sandwiched between the hard components above and below it, the elastomeric gasket can be compressed into a circular gap, 414, in the hard components above and below to form an air tight barrier at the printed circuit board. A key feature of the printed circuit board that maintains the air tight seal may be that there are no holes in the board which are not fully filled and closed. Mounted to the circular board can be a raised slide surface, 415, including flat electrical contacts against which the spring-loaded pins on the bottom of an adjoining module will press. The compression of the spring-loaded pins at the bottom of one module against the flat electrical contacts on the top of an adjoining module can carry the power/data bus from module to module.

Figure 5:
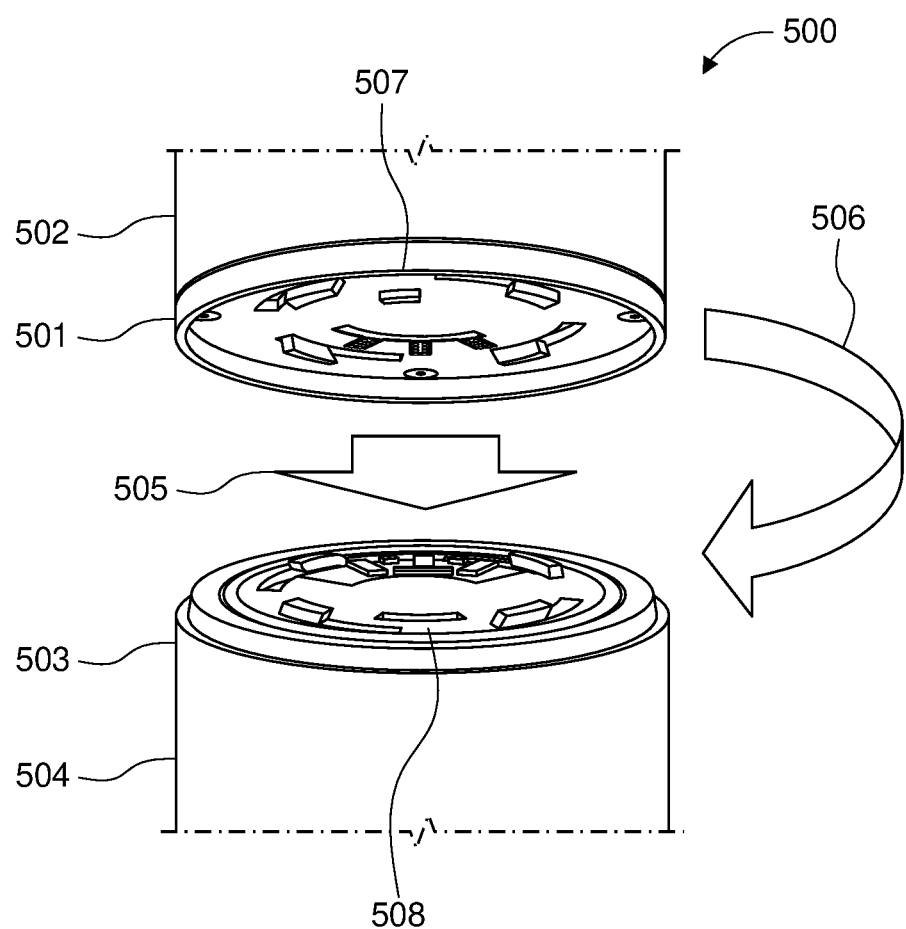
FIG. 5 illustrates an example way the rings can interlock using a combination of axial compressive force and rotation, in accordance with various embodiments.

FIG. 5 illustrates an example way the rings can interlock using a combination of axial compressive force and rotation, in accordance with various embodiments. Referring to FIG. 5, these two sub-assemblies, the bottom ring sub-assembly and the top ring sub-assembly form the mechanical grammar around which all modules may be built and are the underpinnings for the entire modular interlocking system, 500. For all modules in the system, the bottom ring element, 501, in the module above, 502, can be connected to the top ring element, 503, of the module below, 504. This connection can be achieved by applying pressure axially, 505, to press the two modules together. Once pressed together to the extent that the sets of tabs on each ring sub-assembly begin to overlap, the pieces can then be rotated clockwise together. Rotation, 506, continues until the hooks fully overlap and cannot be rotated further. At that point, a small raised bump on the underside of the hooks in the top ring assembly can click into small detents on the underside of the hooks in the bottom ring assembly. This clicking action can provide tactile feedback to the user that the two modules being connected are fully engages and may prevent unintentional disconnection without sufficient force to overcome the bump and detent. A raised rib in the bottom ring, 507, fits into a recess in the top ring, 508, to act as a keying feature to ensure that the modules only connect one way.

Figure 6:
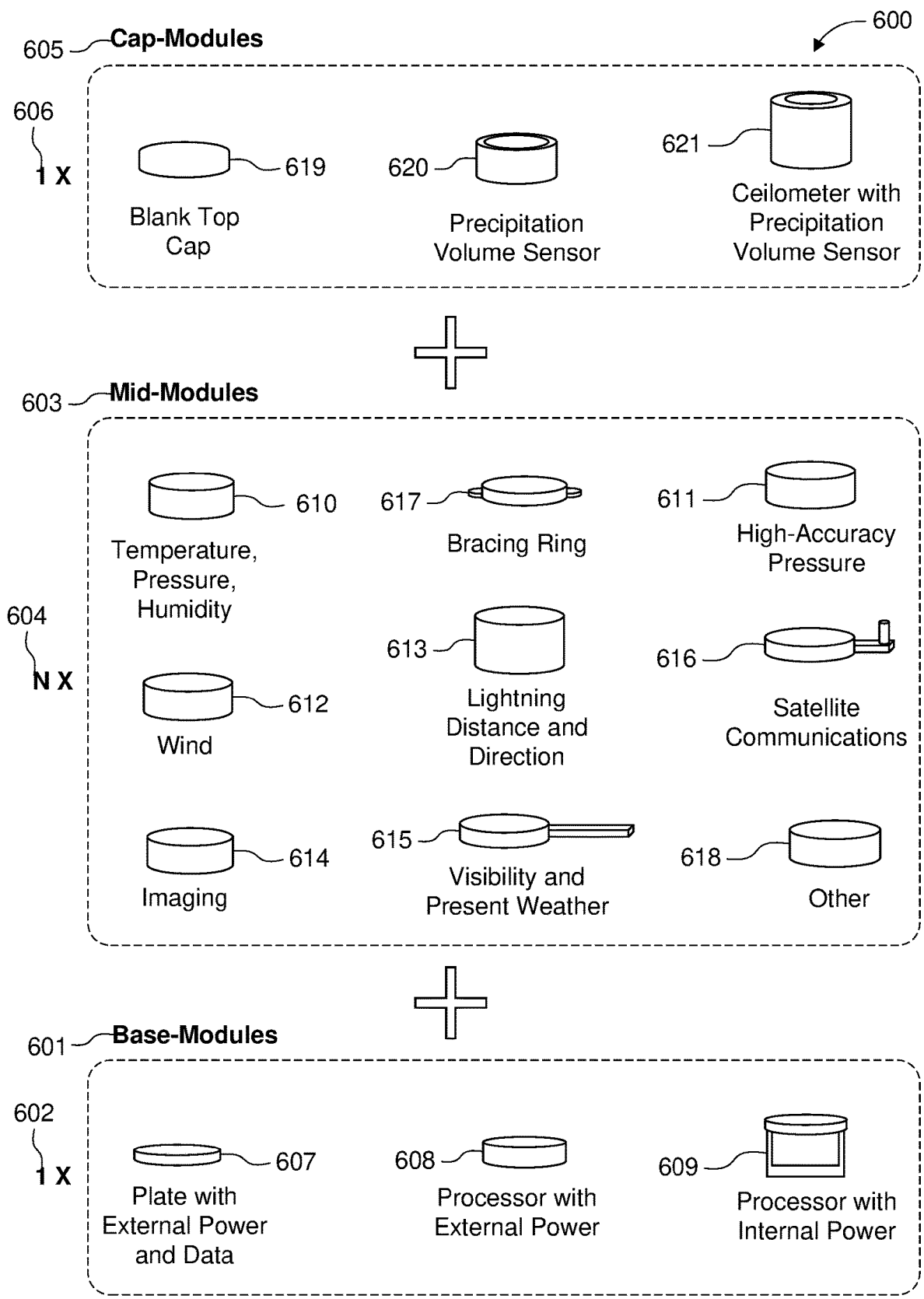
FIG. 6 illustrates three example categories of modules: base-modules, mid-modules, and cap-modules. These sets of modules can comprise the top-level system components and the governing rules for their use, in accordance with various embodiments

FIG. 6 illustrates three example categories of modules: base-modules, mid-modules, and cap-modules. These sets of modules can comprise the top-level system components and the governing rules for their use, in accordance with various embodiments. Referring to FIG. 6, moving to an architectural view, 600, illustrates the system that the electro-mechanical interlock system may create. At an architectural level, modules in the system can be divided into three categories. Base-modules, 601, may be modules which have a top ring section on their top in order to enable stacking of modules above and a mechanical interface at the bottom suitable for a tripod, pole, or other elevated structure. Base modules can serve as the base for any stack of modules, and any stack of modules must have one and only one, 602, base-module.

Mid-modules, 603, may be modules which can have a top ring section on their top to enable stacking of modules above, and which can have a bottom ring section on their bottom to enable stacking on top of other modules. Mid-modules can be added or removed as needed to form any stack of modules, and any stack of modules can have any number of modules, 604, as needed.

Finally, cap-modules, 605, may be modules which can have a bottom ring section at their bottom and can have a weather resistant upper surface which can remain exposed to the environment. Cap-modules can serve as the top cap for any stack of any stack of modules, and any stack of modules must have one and only one, 606, cap-module. There is no limit to the theoretical number and breadth of each of the three module types, but current and common elements of the disclosed technology are described in the following paragraphs.

Within the family of disclosed base-modules, 601, there are three example forms. The base plate with external power and data, 607, can be a simple plate which connects to modules above while bringing in power and bi-directional data connectivity via cable. The base plate may include no source of its own power, and has no capacity to capture, processor, or store data. The base plate base-module may be most useful for two main applications. The first of these applications can be connecting a stack of modules directly to a computer. The second of these applications can be connecting a stack of modules via cable to a base module with an internal processor and external power. The base module with processor and external power, 608, may be a central processor which connects to modules above while bringing in power externally, but which can process data internally and does not require an external data connection, but may include one for external delivery of processed data if desired. The base module with processor and external power may include another external connection to the common power/data bus in order to connect to modules external to its own stack but mounted on a stack started from a simple base plate.

The third disclosed example of a type of base module can be a base module with internal processor and internal power, 609, to support building a small stack of modules above it. Because the integrated power and battery system of the base module with internal processor and internal power may be more limited, the number of modules above it is may be limited by the total amount of power that can be generated by the base module and the total power consumption of the modules above it. Though subject to the limitations of its own internal power, the base module with internal processor and internal power is ideal for compact and fully self-contained module stacks.

Within the family of disclosed mid-modules, 603, there can be many different forms. For example, the temperature, barometric pressure, and humidity sensor, 610, may be a common sensor that would be utilized in many configurations of sensor stacks, providing base-level accuracy on temperature, barometric pressure, and humidity. For applications that require higher accuracy and triple-redundancy, there may be a more specialized high-accuracy pressure module, 611, that can include three high accuracy pressure sensors suitable for aviation-grade barometric pressure measurement. While there may be some functional overlap between these two sensor types in that both contain pressure measurement sensors, the modularity of the overall system allows for the appropriate sensor to be chosen between the two depending on relative importance of accuracy, size, and cost. Also, within the family of mid-modules can be a wind speed and direction sensing module, 612, and a lightning distance and direction sensing module, 613. An imaging module, 614, can also be added, with a panoramic imaging array used to capture images of the surrounding environment. The atmospheric visibility sensor module, 615, may have a distinct mechanical structure because of an arm that extends from the cylindrical portion of the sensor in order to better sample atmospheric parameters. Another module with a protruding arm can be the satellite connectivity module, 616, that uses the arm to provide better visibility to the sky. A third module with a distinct physical appearance can be the bracing ring module, 617, that carries the power/data bus between modules above and below it, but which serves only a mechanical purpose. Installation of a bracing ring may provide a plurality of mount points for connection of bracing wires to stabilize the sensor in high winds on a tripod, pole, or other structure. In addition to these examples of mid-modules, using the modular approach and consistently applying the top ring and bottom ring elements to create interlocking components enables creation of other module, 618, to achieve specific sensing, communications, data handling, or mechanical functions.

Within the family of disclosed cap-modules, 605, there are three disclosed example forms. The blank top cap, 619 can be the simplest form and achieves the minimum requirement of any cap-module of sealing the top electro-mechanical interconnect to prevent exposure of the power/data bus to the outside environment. The blank top cap may not perform any measurement or other function other can serving as a top seal. The precipitation volume sensor, 620, may serve the requirement of a cap-module by sealing the top electro-mechanical interconnect to prevent exposure of the power/data bus to the outside environment, but also utilizes its novel position at the top of the stack to perform useful environmental measurement. Specifically, it can utilize the full diameter of the stack as a rain collector and measures the precipitation that drains from it through a droplet counter in order to assess precise precipitation rate and total precipitation accumulation over time. Precipitation from the funnel drains out of the side of the module because the bottom of the module can form an air-tight seal with the module below it to protect the power/data bus.

The 3rd disclosed example cap-module may be the ceilometer with precipitation volume sensor, 621, which serves the requirement of a cap-module by sealing the top electro-mechanical interconnect to prevent exposure of the power/data bus to the outside environment, but also utilizes its novel position at the top of the stack to perform two critical environmental measurements. Specifically, it can utilize the full diameter of the stack as a rain collector and embeds optical windows in the bottom of the funnel in order to enable measurement of the height of clouds. It can utilize a wiper mechanism to clear the optical window while also measuring the volume of precipitation that flows off of the windows and the total bottom surface of the rain collecting surface.

Figure 7:
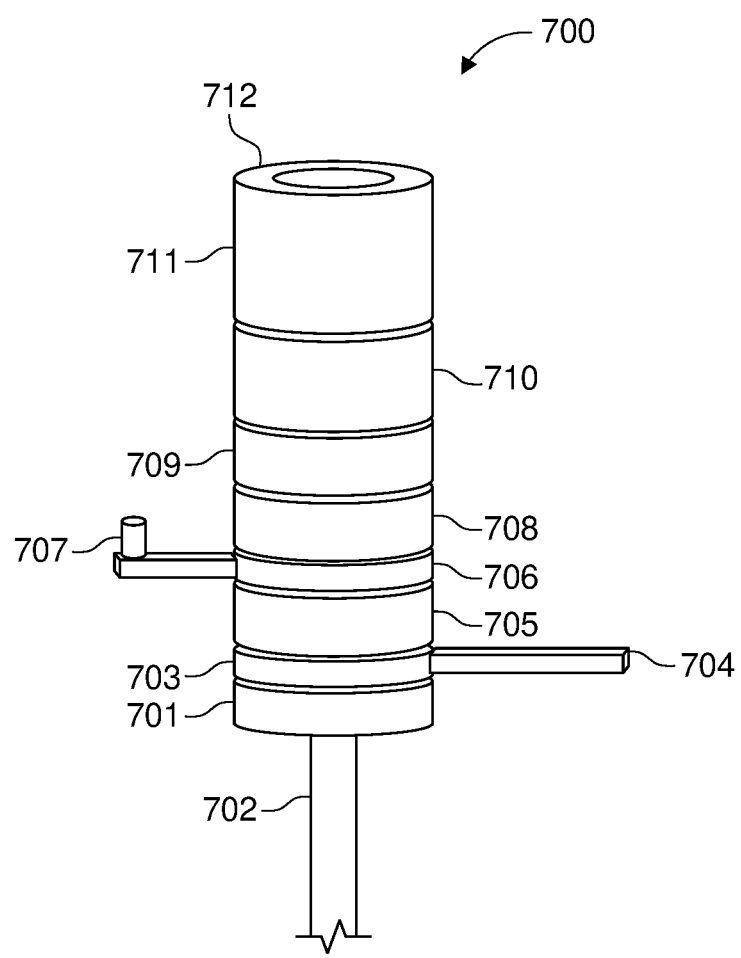
FIG. 7 illustrates an example of a typical configuration of a single sensor stack at an architectural level of independent modules, in accordance with various embodiments.

FIG. 7 illustrates an example of a typical configuration of a single sensor stack at an architectural level of independent modules, in accordance with various embodiments. The variation among base-modules, mid-modules, and cap-modules creates a multitude of possible permutations of sensor configurations that can be created. Referring to FIG. 7, a typical example, 700, of a single stack with a large number of included sensors could utilize the base module with an internal processor and external power connector, 701. This base module could be mounted directly on a pole, 702, or other mounting structure. On top of the base module, the visibility sensor module, 703, with its external sensing arm, 704, provide measurement of atmospheric visibility. Above the visibility sensor module can be the temperature, barometric pressure, and humidity sensor module, 705, followed by the satellite connectivity module, 706, with its external antenna arm, 707, and satellite antenna. Next above on the stack can be the high-accuracy pressure module, 708, that provides an upgraded pressure measurement with triple redundancy, suitable for aviation use. Above this sensor may be sensors for lightning distance and direction, 709, and wind speed and direction, 710. Finally, the cap-module can be a ceilometer, 711, with integrated precipitation volume measurement of rainfall collected from the top surface, 712. While this configuration does not utilize all available module types, it nonetheless represents a very complete system suitable for demanding weather measurement applications.

Figure 8:
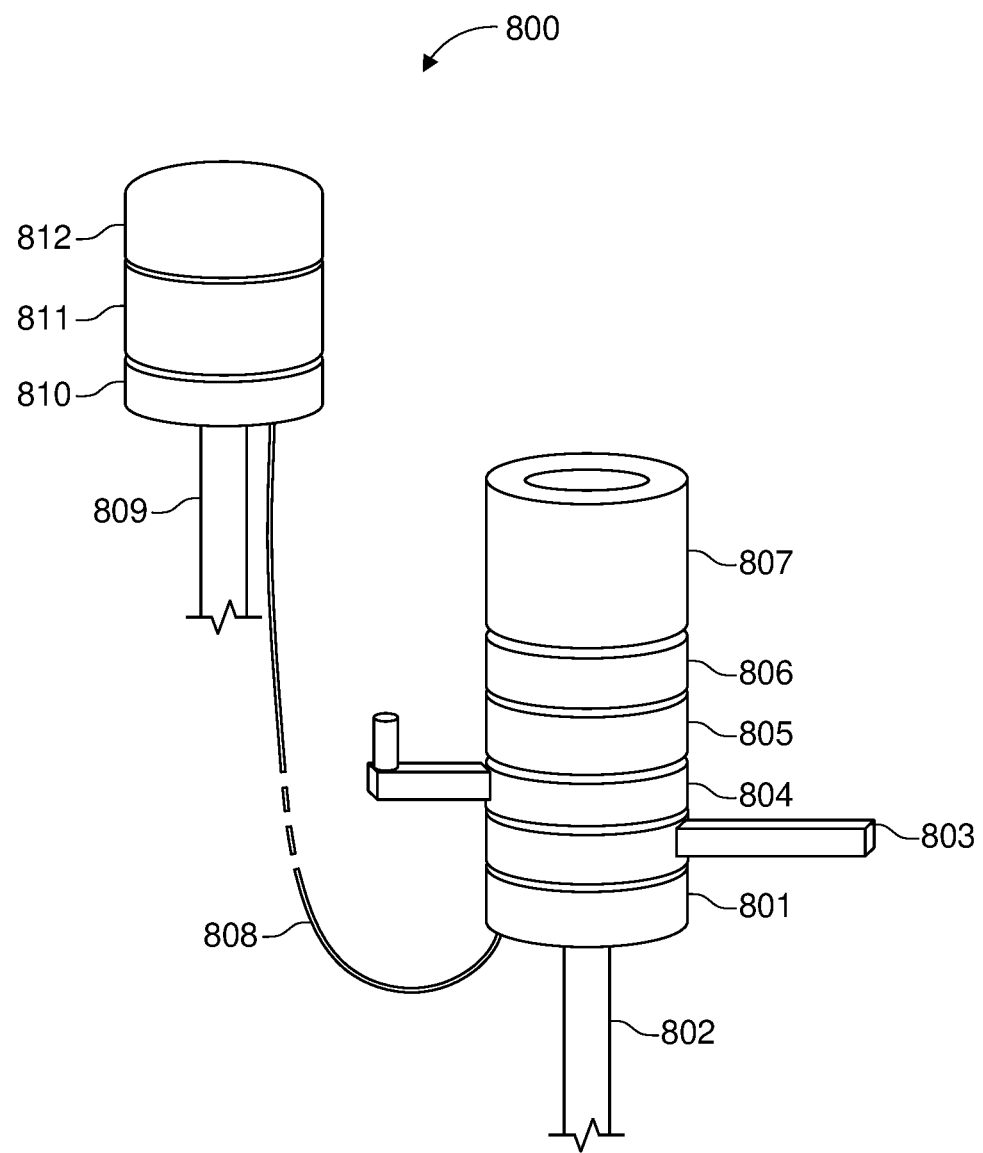
FIG. 8 illustrates an example of a typical configuration of two sensor stacks connected by a cable that can allow them to share a common data/power bus, in accordance with various embodiments.

FIG. 8 illustrates an example of a typical configuration of two sensor stacks connected by a cable that can allow them to share a common data/power bus, in accordance with various embodiments. Referring to FIG. 8, another example, 800, shows how the system can satisfy measurement requirements for sensors that are located at different heights. A common requirement for many weather sensors is to sense more atmospheric parameters at a height above the ground of approximately 6 feet but to sense wind at approximately 30 feet where the wind is less affected by group topography and vegetation. A configuration to meet such a 30 foot wind sensing height requirement, can start with a base-module with internal power and external processor, 801, mounted at a height of approximately 6 feet on a pole, 802. On top of this base module can be an atmospheric visibility sensor, 803, satellite connectivity module, 804, and a temperature, pressure, and humidity sensor, 805. Above these modules can be a lightning distance and direction module, 806, and on the top of this stack may be the ceilometer with integrated precipitation volume measurement, 807. Connected to the base module of this stack via a cable, 808, can be a second base module that may be mounted on a 30-foot tall pole, 809, in order to measure winds at 30 feet as specifically desired for aviation measurements. The second base module, 810, may be a simple base plate with no processor that extends the common power/data bus from the first base module and its internal processor. On top of the second base module may be a wind speed and direction sensing module, 811, and a simple top cap-module, 812, that serves as the top weather seal. This example shows only one simple base plate, 810, connected to the base module with an internal processor, 801, but there is no limit to the number of base plates that can be simultaneously connected to the shared power/data bus via cables and tee joints that branch from this bus.

Figure 9:
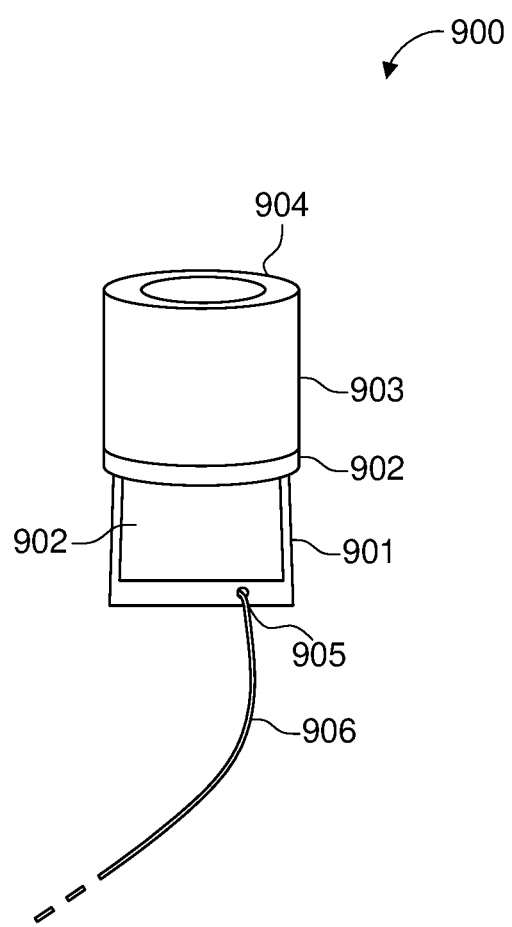
FIG. 9 illustrates an example of a typical configuration of a module that can be utilized as an accessory sensor, in accordance with various embodiments.

FIG. 9 illustrates an example of a typical configuration of a module that can be utilized as an accessory sensor, in accordance with one embodiment. Referring to FIG. 9, a third example, 900, shows a sample configuration to illustrate how any mid-module or cap-module within the family of sensors can become a self-contained, stand-alone, accessory sensor. This example utilizes a base-module, 901, that can have an internal processor for data collection and may have its own internal power supply utilizing integrated, external solar cells, 902, and internal batteries. The top of this self-contained based module can be a top ring assembly that may accept any mid-module or cap-module. In this example, the module attached may be a ceilometer, 903, with integrated precipitation volume measurement of rainfall collected from the top surface, 904. This configuration acts as a fully self-contained ceilometer with integrated power source. This stand-alone sensor can then be attached via its external data port, 905, and a cable, 906 to another data logger or weather sensor system. Although this example illustrates creation of a stand-alone ceilometer sensor, it is equally applicable for formation of a stand-alone visibility sensor, high-accuracy pressure sensor, or any other sensor within the modular family.

Figure 10:
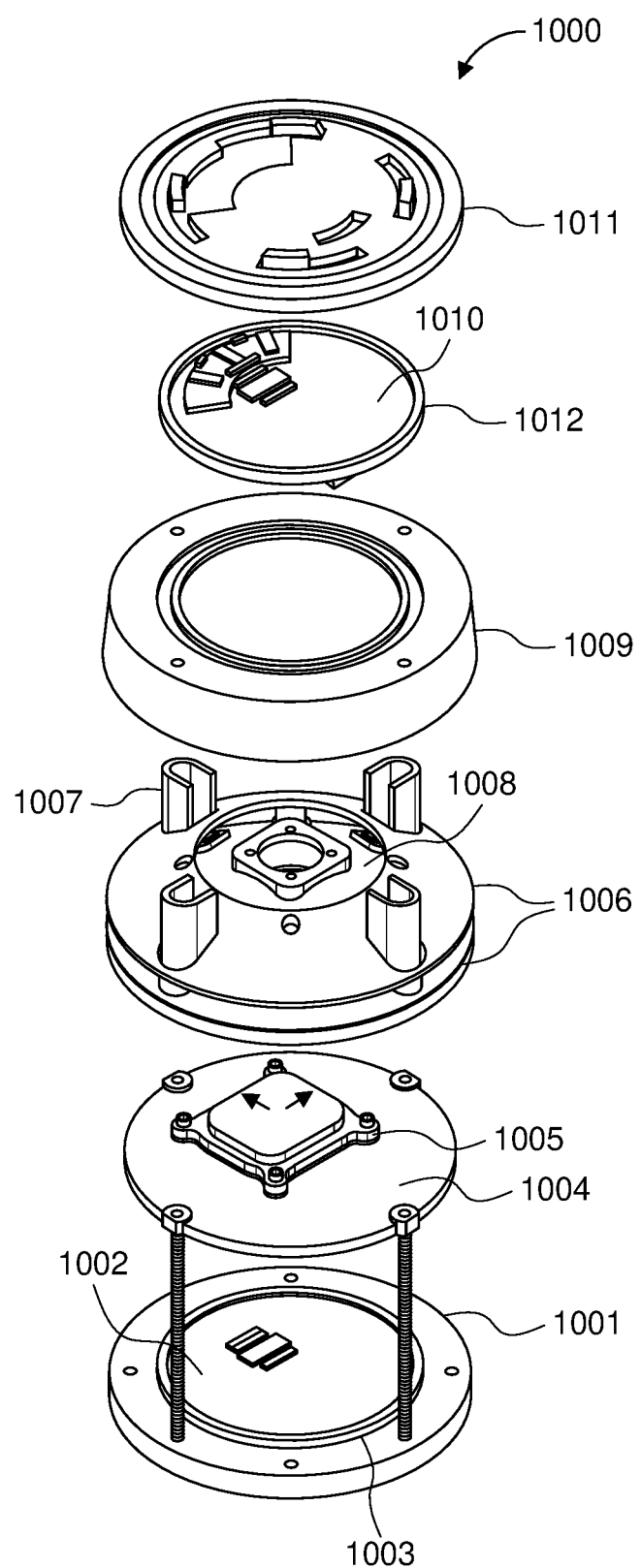
FIG. 10 illustrates an example internal structure and components of the temperature, pressure, and humidity sensing module, in accordance with various embodiments.

FIG. 10 illustrates an example internal structure and components of the temperature, pressure, and humidity sensing module, in accordance with one embodiment. Referring to FIG. 10, following this high-level architectural examination of the modular system, an exploded view of the temperature, pressure, and humidity sensor, 1000, provides a deeper look at the internal structure and components. The structure of this module begins at the bottom with the standard bottom ring element, 1001, that can allow the module to mate to another module below it. Above the bottom ring may be a circular printed circuit board, 1002, with a "C"-shaped rubber gasket around its perimeter, 1003. When the printed circuit board with perimeter gasket is sandwiched between the bottom ring and the circular piece above it, a seal can be formed below the printed circuit board which protects the spring-loaded electrical contacts on the printed circuit board that can be designed in some embodiments to connect to another module below it. Above the circular printed circuit board may be the lower compartment section, 1004, which seals above the circular board and contains an access hatch, 1005, that allows sealing of connectors while also allowing passage of wires out of the hatch. Sealing can be achieved using either high-viscosity sealant and/or a compressible foam or rubber.

Above the lower compartment seal can be the open-air portion of the module which allows the sensors in that portion to have direct access to the ambient atmosphere. The open-air portion of the module may consist of angled, conical slats, 1006, and four pillars, 1007, that allow air to travel freely through the system while still shading the inner portion of the sensing volume. For conditions of extremely stagnant air, a central circulation fan, 1008, forces cool air in from under the lower slats and outward over the slats. On the top of the slats can be a cylindrical piece, 1009, that completes the open-air portion and begins the sealed upper section by holding a second circular printed circuit board, 1010. Above the circular printed circuit can be a top ring piece that compresses the gasket, 1011, to complete the seal.

Figure 11:
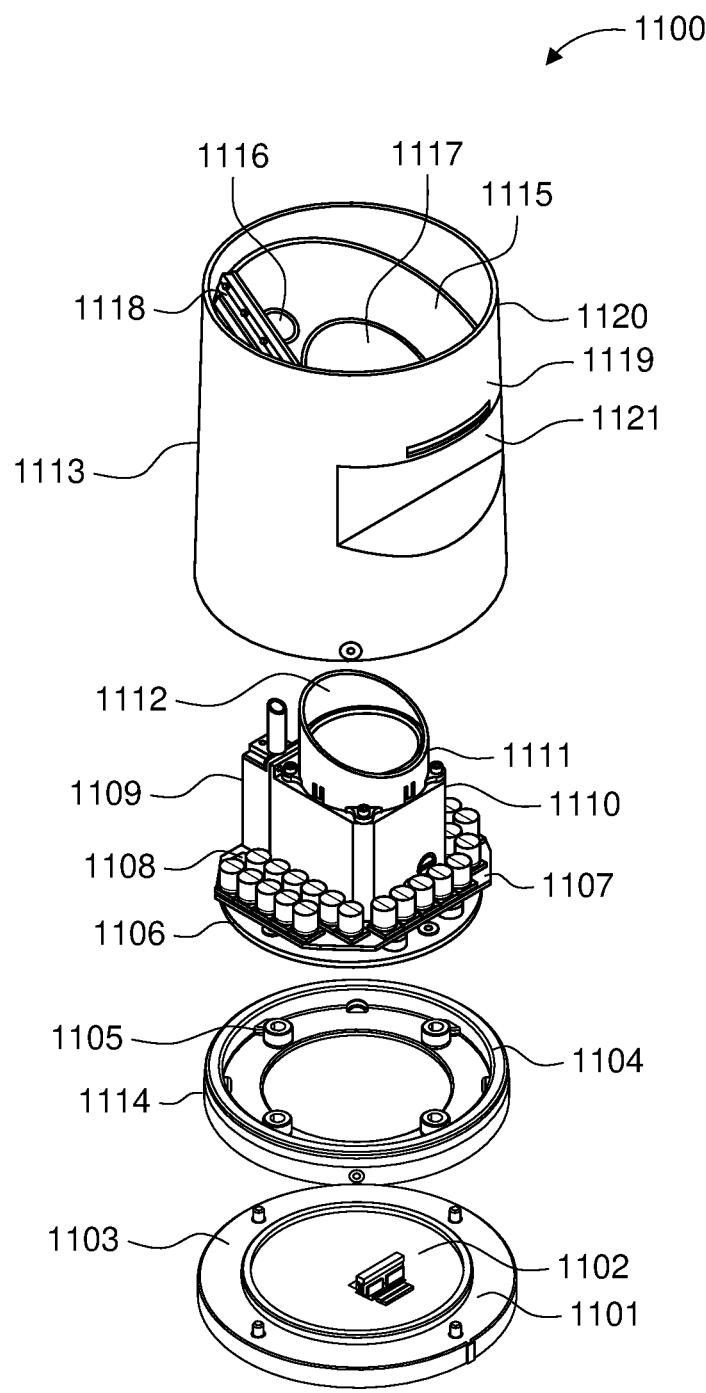
FIG. 11 illustrates an example internal structure and components of a ceilometer module for cloud height and precipitation measurement module, in accordance with various embodiments.

FIG. 11 illustrates an example internal structure and components of a ceilometer module for cloud height and precipitation measurement module, in accordance with one embodiment. Referring to FIG. 11, the second mechanical illustration of sensor module internal structure and components is of the ceilometer module with integrated precipitation sensing, 1100. This structure of this module begins at the bottom with a bottom ring element, 1101, that can allow the module to mate to another module below it. Above the bottom ring can be a circular printed circuit board, 1102, with a "C"-shaped rubber gasket around its perimeter, 1103. When the printed circuit board with perimeter gasket is sandwiched between the bottom ring and the circular piece above it, a seal may be formed.

Above the circular printed circuit board can be the lower compartment section, 1104, that may include supports for the low-profile metal frame, 1106, that supports the weight of the custom lidar unit, 1110, above it. The electro-optical functions of the lidar may be achieved on a single printed circuit board, 1107, that fits within the diameter of the module and includes a large bank of capacitors, 1108, that supply the large surge current of more than 100 amperes to fire the high-power pulsed laser, 1109. Co-aligned with the high-power transmit laser can be a receiver lens, 1111, to focus the light to an internal avalanche photo-diode that can be biased using a novel approach that maintains the output of the avalanche photodiode and amplifier chain at a constant noise level regardless of temperature. Above the receiver lens may be optical filters, 1112, that block direct ambient sunlight, and surrounding the lens is a baffle to block off-axis ambient sunlight. Together, these elements are able to consistently measure the height to cloud bases up to a height of 30,000 ft above ground level which matches or exceed the capabilities of existing commercial ceilometers but with an order-of-magnitude reduction in weight and two orders-of-magnitude reduction in size.

Protecting the lidar can be the outer enclosure, 1113, that seals to an O-ring, 1114, around the cylindrical piece on top of the bottom ring to protect the internal lidar from the outside environment. The top surface of the enclosure, 1115, can be sloped to encourage precipitation and debris to slide off of the embedded transmit window, 1116, and receiver window, 1117. To further ensure that the windows are clear of precipitation and debris, a wiper mechanism, 1118, drags a rubber wiper blade over the windows to force water and debris down the slope of the glass similar to an automotive windshield wiper. At the bottom of the sloped upper surface, a screen allows water to pass, while solid debris can be forced out of an opening above the screen, 1119, and out of the side of the unit. While the use of a rubber wiper to clear water from glass is known within the art, no system uses that cleared water as a precise measure of precipitation amount. All other weather sensor systems keep the clearing of precipitation from the optical ceilometer and collection of rain for measurement of precipitation as separate functions performed by separate pieces of equipment mounted at separate locations. In order to achieve both these functions within a shared top surface, significant iterations and experimentation were utilized to arrive at the structure described above. Unlike existing ceilometers, the upper surfaces of the configuration as described, can deliberately collect rain water within the side walls around the upper surface, 1120, resulting in a defined area of collection. Liquid water that can be collected within this defined diameter flows by gravity down the sloped surface or is driven by the wiper and separated from debris. The remaining water that flows through the screen at the bottom of the sloped surface may be passed through a droplet former that forms the water into consistently sized drops governed by the surface tension of water. Those drops are then counted to measure the precise amount of rainfall before being expelled from the gap in the housing below the sloped surface, 1121. Because the ceilometer can be in the family of cap-modules, it does not allow any module to be connected above it and therefore does not have a top ring.

Figure 12:
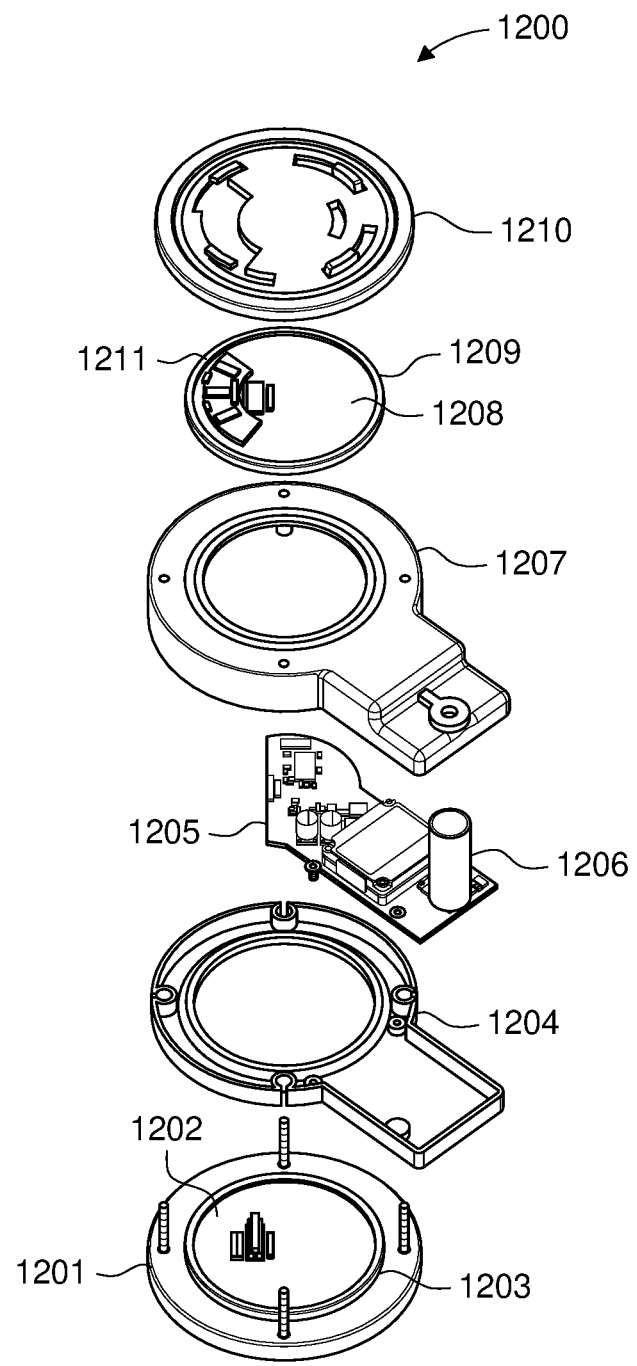
FIG. 12 illustrates an example internal structure and components of a satellite connectivity module, in accordance with various embodiments.

FIG. 12 illustrates an example internal structure and components of a satellite connectivity module, in accordance with one embodiment. Referring to FIG. 12, the third mechanical illustration of sensor module internal structure and components is of the satellite connectivity module, 1200, that illustrates how the modular approach described herein can support external arms when needed by specific sensors or capabilities. In this example, the external arm can be desired to provide the satellite antenna adequate visibility to the sky for transmission and reception of radio signals. The satellite connectivity module begins with a bottom ring, 1201, to enable the module to mate with any other module below it. Above the bottom ring can be a circular printed circuit board, 1202, surrounded by a C-ring seal at its perimeter, 1203, that may be compressed between the bottom ring and the lower arm section, 1204, to form a seal. Mounted on the lower arm section can be the satellite communications electronics board, 1205, that connects electrically directly to the lower circular printed circuit board and holds the satellite antenna, 1206. Covering the satellite communications board can be the upper arm section, 1207. The lower and upper arm section are chemically bonded together with adhesive upon assembly to maintain an air tight seal. Above the bonded arm sections can be another circular printed circuit board, 1208, with a C-ring, 1209, that forms a seal when compressed by a top ring section, 1210. As is the case for any other mid-module, a raised contact plate, 1211, can be mounted above the upper circular printed circuit board to act as an electrical mating surface for any other modules that might be added above it.

Figure 13:
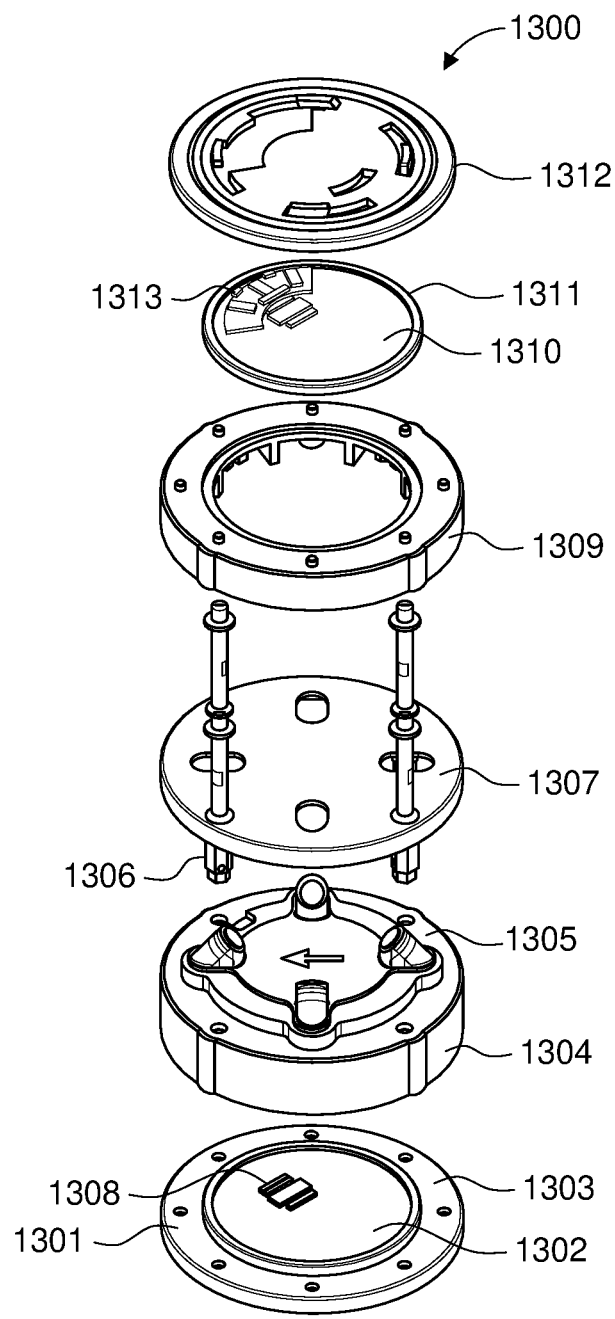
FIG. 13 illustrates an example internal structure and components of a wind measurement module, in accordance with various embodiments.

FIG. 13 illustrates an example internal structure and components of a wind measurement module, in accordance with one embodiment. Referring to FIG. 13, the fourth mechanical illustration of sensor module internal structure and components is of the wind measurement module, 1300, that illustrates how the modular approach described herein can support a very open section to allow air to move freely through it and around it while still allowing a path for all electrical connections for the power/data bus to run from the bottom of the module to the top. The wind measurement module begins with a bottom ring, 1301, to enable the module to mate with any other module below it. Above the bottom ring can be a circular printed circuit board, 1302, surrounded by a C-ring seal at its perimeter, 1303, that may be compressed between the bottom ring and the lower wind section, 1304, to form a seal. The lower wind section may hold four ultrasonic transducers, 1305, that measure wind speed and direction by using a traditional 4-transducer arrangement to determine two orthogonal vectors of two-dimensional wind within the horizontal plane. Novel to this embodiment are four narrow, hollow, vertical posts, 1306, mounted in a rigid plate, 1307, that can mechanically connect the bottom and top portions of the wind module while allowing the passage of signals for the power/data bus between the two portions. The passage of signals can be achieved by connecting a ribbon cable to a ribbon cable connector, 1308, on the lower circular printed circuit board, splitting the cable so that four smaller bundles can be fed through the four hollow posts, then under the upper wind section, 1309, and finally soldered to the upper circular printed circuit board, 1310. Like all other circular printed circuit boards described herein, it can be surrounded by a custom C-ring around its perimeter, 1311, to form a seal when sandwiched under the top ring, 1312. As is the case for any other mid-module, a raised contact plate, 1313, can be mounted above the upper circular printed circuit board to act as an electrical mating surface for any other modules that might be added above it.

While only four specific modules were detailed in exploded views, these illustrations detail the electrical and mechanical grammar around which the full expression of the many various modules in the system can be built. For any other module currently designed or to be designed in the future around this system, the same mechanical and electrical elements can be used in the same fashion to achieve a versatile and modular system suitable for quickly removable and field replaceable modules which are fully packaged as delivered and completely robust against harsh outdoor environments when mated. The interlocking system can therefore achieve what a modular system should, enabling for the first time for weather sensor systems to be built from modular blocks that link together directly, regardless of their specific technology or function.

The embodiments described herein are examples that show typical use while also showing the potential breadth possible. As noted in the disclosure, the technology can be modular in its architecture and in its construction and will by normal use form alternate embodiments as permutations and combinations of the aforementioned modules. The enclosure, mounting plate, and other mechanical components can be produced in various materials including metals and plastics and by various manufacturing techniques including casting, molding, 3D printing, stamping, and bending. While a shared power/data bus is described, other electrical variations may also be used. The disclosure herein is not intended to be exhaustive as to all permutations and combination of modules that can be formed. It is intended to be illustrative of the dimensions of modularity enabled by the disclosed architecture but not limiting of scope.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 14:
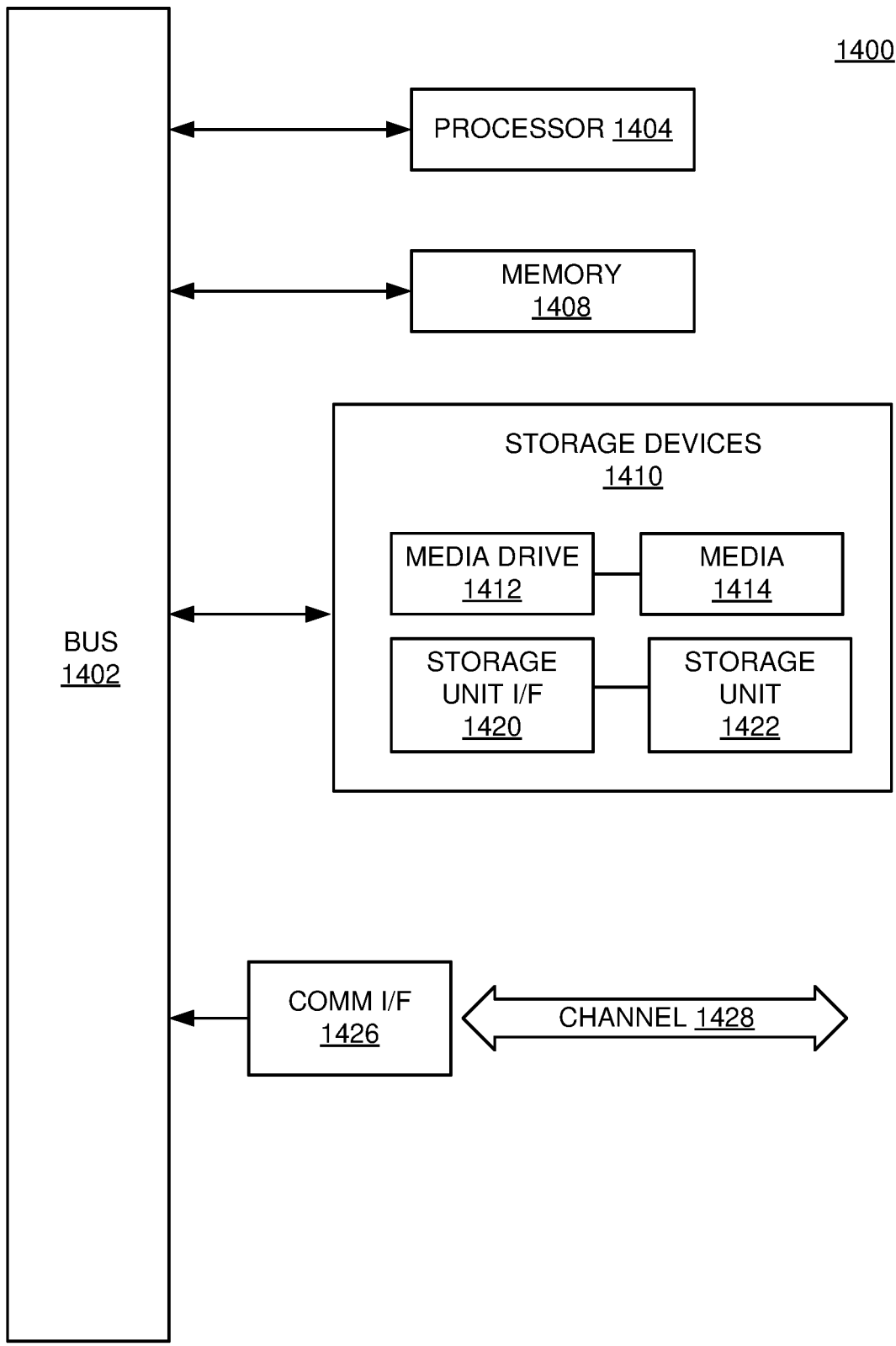
FIG. 14 illustrates an example computing module that may be used in implementing various features of various embodiments of the disclosed technology.

The terms "substantially" and "approximately" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Where components or modules of the technology are implemented in whole or in part using software, in one embodiment, these software elements can be implemented to operate with a computing or processing module capable of carrying out the functionality described with respect thereto. One such example computing module is shown in FIG. 14. FIG. 14 illustrates an example computing module that may be used in implementing various features of various embodiments of the disclosed technology. Several embodiments are described in terms of this example-computing module 1400. After reading this description, it will become apparent to a person skilled in the relevant art how to implement the technology using other computing modules or architectures.

Referring now to FIG. 14, computing system 1400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing system 1400 might also represent computing capabilities embedded within or otherwise available to a given device. For example, a computing module might be found in other electronic devices such as, for example, digital cameras, navigation systems, cellular telephones, portable computing devices, modems, routers, wireless access points (WAPs), terminals and other electronic devices that might include some form of processing capability.

Computing system 1400 might include, for example, one or more processors, controllers, control modules, or other processing devices, such as a processor 1404. Processor 1404 might be implemented using a general-purpose or special-purpose processing engine such as, for example, a microprocessor, controller, or other control logic. In the illustrated example, processor 1404 is connected to a local bus 1402, although any communication medium can be used to facilitate interaction with other components of computing system 1400 or to communicate externally. Note that the local bus, 1402, is separate from, and not interconnected with the shared power and data bus described above for module-to-module interconnectivity.

Computing system 1400 might also include one or more memory modules, simply referred to herein as main memory 1408. For example, preferably random access memory (RAM) or other dynamic memory, might be used for storing information and instructions to be executed by processor 1404. Main memory 1408 might also be used for storing temporary variables or other intermediate information during execution of instructions to be executed by processor 1404. Computing system 1400 might likewise include a read only memory ("ROM") or other static storage device coupled to local bus 1402 for storing static information and instructions for processor 1404.

The computing system 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing system 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory module) and memory slot, a PCMCIA slot and card, and other fixed or removable storage units 1422 and interfaces 1420 that allow software and data to be transferred from the storage unit 1422 to computing system 1400.

Computing system 1400 might also include a communications interface 1426. Communications interface 1426 might be used to allow software and data to be transferred between computing system 1400 and external devices. Examples of communications interface 1426 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1426 might typically be carried on signals, which can be electronic, electromagnetic (which includes optical) or other signals capable of being exchanged by a given communications interface 1426. These signals might be provided to communications interface 1426 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A weather sensor comprising:
    a ceilometer module comprising two optical windows embedded in a recessed and sloped surface;
    a first optical window of the two optical windows configured to transmit a laser;
    a second optical window of the two optical windows configured to receive a reflection of the laser;
    a vertical wall circumscribes the recessed and sloped surface and the two optical windows; wherein the recessed and sloped surface within the vertical wall collects precipitation; and
    the ceilometer module measures cloud height and precipitation volume concurrently based on the collected precipitation and the collected laser reflection.

2. The weather sensor of claim 1, wherein the ceilometer module further comprises a droplet former and a droplet counter connected to the recessed and sloped surface, wherein the recessed and sloped surface guides the collected precipitation through the droplet former and the droplet counter to measure the precipitation volume.

3. The weather sensor of claim 2, wherein the ceilometer module further comprises a wiper on the recessed and sloped surface directs the collected precipitation to the droplet counter and thereafter an outlet in the lower portion of the vertical walls of the ceilometer module.

4. The weather sensor of claim 1, wherein the ceilometer module further comprises a lidar unit.

5. The weather sensor of claim 4, wherein the lidar unit comprises the laser generating light transmitted from the first optical window.

6. The weather sensor of claim 5, wherein the lidar unit further comprises a circuit board comprising a bank of capacitors supplying current to power the laser.

7. The weather sensor of claim 6, wherein the lidar unit further comprises a receiver lens focusing reflected light from the laser to an internal avalanche photo-diode measuring the cloud height.

8. The weather sensor of claim 7, wherein the ceilometer module measures the cloud height using electro-optical functions associated with the lidar unit and the collected reflected light from the laser to measure a height up to a cloud base above ground level.

\* \* \* \* \*